United States Patent
Mednick

[15] 3,655,524
[45] Apr. 11, 1972

[54] GLYCIDOL ISOLATION BY AZEOTROPIC DISTILLATION WITH A LOWER-BOILING ENTRAINER

[72] Inventor: Sol Abraham Mednick, Baltimore, Md.
[73] Assignee: FMC Corporation, New York, N.Y.
[22] Filed: Apr. 27, 1970
[21] Appl. No.: 32,273

[52] U.S. Cl.....................203/67, 203/62, 203/68, 203/69, 203/70, 260/348.5 L
[51] Int. Cl....................................................B01d 3/36
[58] Field of Search...............260/348.5 L, 348, 348.6; 203/67, 68, 70, 62, 69

[56] References Cited

UNITED STATES PATENTS

| | | | |
|---|---|---|---|
| 2,224,849 | 12/1940 | Groll et al. | 260/348.6 |
| 2,248,635 | 7/1941 | Marple et al. | 260/348.6 |
| 3,374,153 | 3/1968 | Naglien | 203/68 |
| 3,457,282 | 7/1969 | Polak et al. | 260/348.6 |
| 3,509,183 | 4/1970 | Wenzke et al. | 260/348.5 L |

Primary Examiner—Wilbur L. Bascomb, Jr.
Attorney—Pauline Newman, Charles C. Fellows and Eugene G. Seems

[57] ABSTRACT

This specification discloses a process for isolating glycidol from a solution in a solvent which boils above 126° C. and which forms a low-boiling azeotrope with glycidol that is homogeneous when condensed and cooled to room temperature. The glycidol separation is affected by adding to this solution, tetrachloroethylene or a liquid aliphatic, cycloaliphatic or chlorinated aliphatic hydrocarbon; these additives form even lower boiling azeotropes with glycidol, and the lower boiling azeotrope can be distilled away from the original solvent. The noted additives have the property that their lower boiling azeotropes with glycidol, upon condensation and cooling, separate at 20° to 40° C. and even above, into two phases; one phase is rich in glycidol and the second phase contains relatively little glycidol. The two phases can be easily separated, for example, by decantation. If glycidol of higher purity than that of the glycidol-rich phase is desired, it may be obtained by distillation of that phase.

6 Claims, 2 Drawing Figures

PATENTED APR 11 1972 3,655,524

INVENTOR.
SOL ABRAHAM MEDNICK
BY Charles E. Fallow

GLYCIDOL ISOLATION BY AZEOTROPIC DISTILLATION WITH A LOWER-BOILING ENTRAINER

BACKGROUND OF THE INVENTION

1. Field of the Invention

Isolation of glycidol from a homogeneous azeotropic mixture.

2. Description of the Prior Art

Glycidol is a useful chemical intermediate, particularly for producing glycerine, fatty acid monoglycerides, and the like. Glycidol is formed advantageously by the epoxidation of allyl alcohol. Such an epoxidation can be conducted by reacting allyl alcohol with an organic hydroperoxide in the presence of a suitable catalyst or, more preferably, by reacting allyl alcohol with peracetic acid in an organic solvent.

A process for converting allyl alcohol to glycidol using peracetic acid in a suitable solvent is disclosed in U.S. Pat. application Ser. No. 653,847, filed July 17, 1967 now U.S. Pat. No. 3,509,183 issued Apr. 28, 1970. This process produces glycidol in a solvent such as acetone, ethyl acetate, diisobutyl ketone, o-xylene, cumene, pseudocumene or the like. The preferred process uses those solvents which boil above about 126° C., and which form homogeneous azeotropes, that is, azeotropes which remain homogeneous when condensed and cooled to room temperature. A method for separating glycidol from its homogeneous solutions with the preferred solvents is not disclosed.

A method for separating glycidol from a mixture of a solvent or reaction diluent, allyl alcohol, water, and high-boiling by-product materials which result from epoxidizing allyl alcohol with an organic hydroperoxide is described in U.S. Pat. No. 3,374,153, issued Mar. 19, 1968, and assigned to Halcon International Corporation. According to the process described, glycidol is recovered by first separating the allyl alcohol by distillation. Separation of the glycidol and the solvent from high boiling materials is then achieved in a second distillation. The glycidol is obtained overhead as a low boiling azeotrope with solvent; this azeotrope is homogeneous when condensed and cooled to about room temperature (20° C.). The azeotrope distillate is then extracted with water to recover a water solution of glycidol substantially free of the solvent. Water is removed from the glycidol-water solution by distillation, and the residue is distilled at high vacuum to afford high purity glycidol.

The isolation of pure glycidol by distillation of the water extract as disclosed in U.S. Pat. No. 3,374,153 is unsatisfactory since distillation of water is costly; and, even at moderately reduced pressures the loss of glycidol by hydrolysis is greater than desirable. A method for recovering glycidol from homogeneous azeotropes that does not require extraction of the glycidol with water has therefore remained desirable.

SUMMARY OF THE INVENTION

I have now discovered a simple procedure for separating glycidol from a solution in a solvent which boils above 126° C. and which forms a homogeneous azeotrope with glycidol. I accomplish this separation by adding to this homogeneous azeotrope solution an additional solvent which may be tetrachloroethylene or a liquid boiling above 80° C. selected from the group consisting of aliphatic, cycloaliphatic and chlorinated cycloaliphatic hydrocarbons to form with the glycidol a lower boiling azeotrope which I distill preferentially away from the original solvent. The additional solvent forms a heterogeneous azeotrope with glycidol, that is an azeotrope which separates into two phases, when condensed and cooled, to 20° to 40° C. or even above. One of the heterogeneous phases is rich in glycidol and the other phase contains relatively little glycidol. I then distill the heterogeneous glycidol azeotrope away from the original solvent which boils above 126° C., condense and cool the heterogeneous azeotrope to a temperature at which it separates into two phases, often as high as 40° C. or even above, and separate the two phases by decantation or other conventional means. One phase is rich in glycidol and this glycidol-rich phase is distilled, when it is necessary or desirable, to isolate pure glycidol.

DESCRIPTION OF THE INVENTION AND THE PREFERRED EMBODIMENTS

Figure 2:
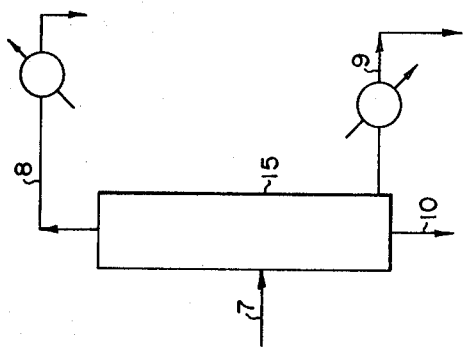
FIG. 2 is a schematic diagram of the process for recovering pure glycidol from a glycidol-rich product.

Glycidol is advantageously produced by epoxidizing allyl alcohol with peracetic acid in solvents boiling above about 126° C. in which the allyl alcohol, glycidol by-products of the epoxidation are all soluble. The solvents most useful in conducting this epoxidation, such as methyl ethyl ketone, cumene, ethyl benzene, o-, m-, and p-xylenes boil above 126° C. and form azeotropes with glycidol upon distillation that are homogeneous when condensed and cooled to room temperature. After separation of low boiling impurities, the glycidol and solvent may be separated by azeotropic distillation from high boiling impurities. Glycidol can be readily separated from these single-phase azeotropic distillates by extraction with water. However, separation of water from the extract by distillation is costly and results in loss of glycidol due to hydrolysis.

The process of this invention separates glycidol from high boiling, single-phase azeotropic distillates by a second, preferential azeotropic distillation with an azeotroping solvent which meets the following requirements:

1. The azeotroping solvent must be unreactive chemically with glycidol, and must boil above 80° C.

2. The relative volatility of the second azeotrope must be sufficiently different from that of the original glycidol-solvent azeotrope so that satisfactory separation of the second, lower-boiling azeotrope can be achieved with little loss of the lower-boiling azeotrope in the residual solvent from the first azeotrope, and with little loss of the high-boiling azeotroping solvent in the distillate.

3. The co-solubility relationships of glycidol and the solvent in the lower boiling second azeotrope distillate must be such that when condensed and cooled, the ingredients separate into two phases at temperatures of 20° to 40° C. and above; one phase being rich in glycidol and the second being relatively lean in glycidol.

Suitable azeotroping solvents that meet these criteria include aliphatic and cycloaliphatic hydrocarbons such as n-octane, n-heptane, isooctane and ethyl cyclohexane; chlorinated aliphatic hydrocarbons such as hexyl chloride; and tetrachloroethylene. The selection of an azeotroping solvent to form the lower-boiling, second azeotrope which phase splits on cooling should be made with care so that a sufficient difference in volatility exists between the lower boiling, heterogeneous azeotrope and the higher boiling, homogeneous, single-phase azeotrope.

The paraffinic hydrocarbons such as isooctane, n-octane, and n-heptane are preferred as these materials are readily available at low cost and they form an azeotrope with glycidol which, upon condensation, separates into two liquid phases, one of which is at least 95 percent glycidol. Chlorinated hydrocarbons such as hexyl chloride and tetrachloroethylene, though useful in forming low-boiling azeotropes with glycidol that split into two phases upon condensation and cooling, are not as preferred as the aliphatic materials because a smaller proportion of the glycidol is separated in the glycidol-rich phase, and these chlorinated materials cost more per gallon than do the aliphatic compounds. Moreover, under some distillation conditions, the highly chlorinated materials are unduly corrosive.

The separation of glycidol by the process of this invention utilizes conventional distillation techniques. Continuous, vacuum distillation is preferred in order to minimize the residence time and temperature so that the reaction of glycidol with itself may be minimized. The pressure at which the distillation is conducted is not critical, and may be selected to permit condensation of the vapors in conventional condensers with ordinary cooling water. The number of trays and the reflux ratios selected to maximize the separation may be selected to maximize the azeotropic composition, and minimize the amount of the lower-boiling azeotroping agent in the underflow from the distillation column.

The lower-boiling, heterogeneous azeotrope, after it is distilled away from the first, high-boiling homogeneous azeotrope, is condensed and separated in any convenient manner, such as by decantation.

Figure 1:
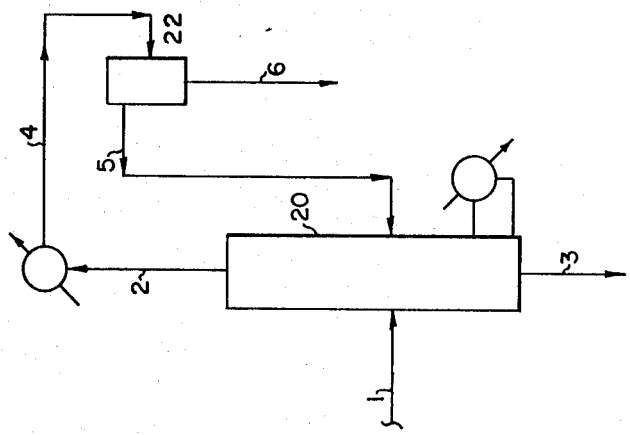
FIG. 1 is a schematic diagram of the process for producing a glycidol-rich product.

My process for the separation of glycidol from azeotroping solvent, which boils above 126° C. and in which the glycidol is soluble at 20° C. and below, is described with reference to FIG. 1. A solution of glycidol, generally 8 to 15 percent by weight, dissolved in a high boiling azeotroping solvent such as diisobutyl ketone is fed through line 1 to distillation column 20, containing an inventory of the lower boiling azeotroping solvent, where the feed tray temperature is maintained at about 81°–85° C. when the higher-boiling azeotroping solvent is diisobutyl ketone and the lower-boiling azeotroping solvent is n-octane.

In Column 20, I prefer, when using diisobutyl ketone as the high-boiling azeotroping solvent and n-octane as the low-boiling azeotroping solvent, to maintain the vapor temperature at about 67° C. when Column 20 is operating at 125 millimeters of mercury pressure. Under these conditions the reboiler temperature is about 114° C. and the column underflow (line 3) will be composed of essentially pure diisobutyl ketone. The glycidol-n-octane azeotrope is removed through line 2 at a vapor temperature of about 67° C. The overhead is condensed and fed through line 4 into decanter 22. The overflow from the decanter, which consists essentially of n-octane, is returned to about the midpoint of Column 20 through line 5. The glycidol rich underflow from decanter 22, which is greater than 96 percent glycidol, is obtained in line 6 in suitable purity for most uses.

If glycidol of higher purity than 96–97 percent glycidol recovered from this operation is desired, the 96–97 percent glycidol may be distilled. Continuous, distillation at reduced pressure is preferred to minimize glycidol degradation. For convenience, the pressure may be selected so that the vapors are condensed with ordinary cooling water in conventional condensers. The number of trays and the reflux ratio are selected to minimize the quantity of octane in the underflow.

FIG. 2 describes a process for purifying a glycidol-rich product containing a small amount of a low-boiling azeotroping solvent such as n-octane. Glycidol-rich product (as from line 6, FIG. 1, discussed above) is fed to Column 15, which which is operated at 50 mm. Hg. pressure, through line 7. The vapors, n-octane-glycidol azeotrope and some glycidol at 42°–45 C., are condensed and removed through line 8 to a receiver. This distillate may be recycled to the previous distillation decanter, line not shown, so that neither the n-octane nor the glycidol is lost. At the bottom of the column, a sidestream vapor, of high purity glycidol is removed through line 9 and condensed. In this manner, high boiling impurities formed by the self-condensation of glycidol are separated. A small portion of the feed, about 5 percent, is removed as liquid underflow through line 10. This last stream may also be recycled to the previous distillation, line not shown, so that glycidol contained in this stream is not lost.

The process of this invention is further illustrated in the following examples which are given by way of example and not by way of limitation, to illustrate the invention to those skilled in the art. All parts and percentages are by weight, unless otherwise specified.

EXAMPLE 1

A solution containing 12.27 percent glycidol, by weight, dissolved in diisobutyl ketone, was fed in three separate distillations, to a 1-inch Oldershaw distillation column, constituted in descending order as follows: refrigerated condenser, variable reflux head containing a temperature sensor, 5-tray section, feed section containing a temperature sensor, 10-tray section, feed section containing a temperature sensor, 10-tray section, a temperature sensor section, 5-tray section and a reboiler containing a temperature sensor. The variable reflux head was fitted with a take-off line that passed through a condenser to a decanter. The overflow from the decanter was connected to the upper feed section on the column. The underflow from the decanter discharged into a receiver.

The column was started up, prior to starting the glycidol feed, by filling the decanter with n-octane (95 percent purity), adjusting the column pressure to 125 mm. Hg pressure, feeding 100 to 150 milliliters of diisobutyl ketone into the column, and starting up the reboiler. n-Octane was then fed to the upper feed section at 0.5 ml. per minute. When the temperature at the fifteenth tray (counting down from the top) was 85° C. the n-octane feed was stopped, and 200 ml. of a mixture of glycidol, 10 percent in diisobutyl ketone, was slowly fed to the lower feed section. When the column operation was stabilized with the synthetic feed, then the 12.27 percent solution of glycidol was fed to the column. Three distillations were made using the 12.27 percent glycidol solution; the feed rates, column conditions during distillation, distillation results, and material balances are set forth in Table 1.

TABLE 1

| Distillation | A | B | C |
|---|---|---|---|
| Column conditions: | | | |
| Pressure, mm. Hg | 125 | 125 | 125 |
| Temperature, ° C.: | | | |
| Vapor | 67 | 67.5 | 68 |
| 5th tray (reflux return) | 68 | 68.5 | 69 |
| 15th tray (glycidol feed) | 81–85 | 76–85 | 80–85 |
| Feed temperature | 80–85 | 70–85 | 75–85 |
| 25th tray | 113–113.5 | 112.5 | 112.5 |
| Reboiler | 114–114.5 | 113.5 | 113.5 |
| Feed, grams | 857 | 710 | 465 |
| Time, minutes | 110.7 | 111.9 | 81.5 |
| Feed rate gram/minute | 7.74 | 6.34 | 5.71 |
| Distillate (grams) | 112.3 | 91.1 | 58.5 |
| Percent glycidol | 96.36 | 96.17 | 96.94 |
| Underflow (grams) | 748 | 618 | 413 |
| Weight material balance | 100.4 | 99.9 | 101.4 |
| Glycidol balance: | | | |
| Grams in feed | 105.2 | 87.1 | 57.1 |
| Grams in distillate | 108.2 | 87.6 | 56.7 |
| Grams in underflow | 0.3₇ | 0.1₉ | 0.1₇ |
| Balance | 103.2 | 100.8 | 99.6 |
| Percent of feed in underflow | 0.4 | 0.2 | 0.3 |

EXAMPLE 2

A solution of 3,105 grams of glycidol and n-octane, prepared from 3,000 grams of 99.6 percent glycidol and 105 grams of n-octane, was fed to a 1-inch Oldershaw distillation column, constituted in descending order as follows: condenser, variable reflux head containing a temperature sensor, a 5-tray section, a feed section containing a temperature sensor, a temperature sensor section, a 5-tray section, a section for the removal of a vapor sidestream, and a reboiler containing a temperature sensor. The variable reflux head, the sidestream section, and the reboiler were fitted with take-off lines that passed through coolers to receivers.

The pressure in the column was adjusted to 50 mm. Hg, 350 ml. of the glycidol-octane mixture was added, and then heat was supplied to the reboiler. When the vapors reached the condenser, the continuous feed of the mixture was initiated to the feed section and also, removal of distillate vapor, sidestream, and liquid underflow from the reboiler. When stable conditions were achieved, two distillations were made using the glycidol-octane mixture. The feed rates, column conditions, stream compositions, and material balances are set forth in Table 2.

EXAMPLE 3

A number of potential azeotroping agents were screened by conducting batch distillations at atmospheric pressure and reduced pressure using a four-foot helice-packed column at a

TABLE 2

| Distillation | A | B | Overall |
|---|---|---|---|
| Column conditions: | | | |
| Pressure, mm. Hg.: | 50 | 50 | |
| Temperatures, °C. | | | |
| Vapor | 42-45 | 42-45 | |
| 5th tray (feed) | 44-46 | 44-46 | |
| Feed | 40-46 | 40-46 | |
| 10th tray | 75-78 | 75-78 | |
| 15th tray (reboiler, sidestream) | 93-94 | 93-94 | |
| Reflux ratio | 10:1 | 17:1 | |
| Feed: | | | |
| Weight, g | 1,035 | 1,035 | |
| Time (min.), g. (min.) | 30.6, (33.8) | 29.9, (34.6) | |
| GLD, percent, (g) | 96.2, (996) | 96.2, (996) | 96.2, (1,992) |
| Octane, percent, (g.) | 3.4, (35) | 3.4, (35) | 3.4, (70) |
| Distillate: | | | |
| Weight, g | 43 | 48 | 91 |
| GLD, percent (g.) | 26.6, (11.4) | 29.6, (14.2) | 28.1, (25.6) |
| Octane, percent, (g.) | 73.0, (31.4) | 68.7, (33.0) | 70.8, (64.4) |
| Sidestream: | | | |
| Weight, g | 908 | 942 | 1,850 |
| GLD, percent, (g) | 99.6, (904) | 99.5, (937) | 99.5, (1,841) |
| Octane, percent, (g.) | 0.18, (1.6) | 0.21, (2.0) | 0.20, (3.6) |
| Underflow: | | | |
| Weight, g | 49 | 59 | 108 |
| GLD, percent, (g.) | 83.7, (41.0) | 87.6, (51.7) | 85.8, (92.7) |
| Octane, percent, (g.) | 0.19, (0.093) | 0.20, (0.12) | 0.20, (0.21) |
| Balances: | | | |
| Weight, g., percent | 1,000, (96.6) | 1,049, (101.4) | 99.0 |
| GLD, g., percent | 956, (96.0) | 1,003, (100.7) | 1,959, (98.3) |
| Octane, g., percent | 33, (94) | 35, (100) | 68, (97) |

5/1 reflux ratio. The materials found to form non-homogeneous distillates are indicated in Table 2. It was found that ethylbenzene, o-xylene, and chlorobenzene formed low boiling homogeneous azeotropes with glycidol and hence were not useful in practicing this invention. The chlorinated hydrocarbons were found to be not quite as useful as the paraffinic hydrocarbons since a smaller proportion of glycidol is separated in the azeotrope. Run numbers 1, 2, 4, 7, 8, 9, and 10 were runs in which mixtures of about 25 percent glycidol in the azeotroping agent was simply distilled. The condensed distillate separated into two phases which were separated and analyzed. In Examples 3, 5, 6, 7a, and 11, 50 parts of the low boiling azeotroping agent was added to 50 parts of 25 percent solutions of glycidol and high-boiling azeotroping agents that form homogeneous azeotropes. The low-boiling heterogeneous azeotrope was distilled away from the high-boiling azeotroping agent. The glycidol-rich phase was analyzed for glycidol content. The data in Table 3 show that the hydrocarbon materials are much more efficient in removing glycidol from the lower phase than are the chlorinated hydrocarbons.

This invention has been explained and exemplified in a manner so that it can be readily practiced by those skilled in the art. The best mode contemplated by the invertor has been set forth. Clearly, within the scope of the appended claims the invention can be practiced by those skilled in the art having the benefit of the disclosure, otherwise than as specifically described and exemplified herein.

What is claimed is:

1. The process for isolating glycidol from an azeotroping agent which boils above 126° C. and which forms a homogeneous azeotrope with glycidol, which comprises:
    a. Adding to the glycidol-azeotrope a second azeotroping solvent selected from the group consisting of aliphatic hydrocarbons, and, chlorinated aliphatic hydrocarbons which second azeotroping solvent forms an azeotrope with glycidol which has a lower boiling point than the homogeneous azeotrope, and which separates at 20° - 40° C. into two phases,
    b. Distilling the lower boiling azeotrope away from the azeotroping agent boiling above 126° C., and
    c. Separating the two-phase distillate into a glycidol rich phase and a glycidol lean phase.

2. The process according to claim 1 in which the second azeotroping agent is an aliphatic hydrocarbons boiling above 80° C. which form an azeotrope with glycidol which upon condensation separates into two liquid phases, one of which is at least 95 percent glycidol.

3. The process according to claim 1 in which the second azeotroping agent is selected from the group consisting of n-heptane, iso-octane, n-octane, n-hexylchloride and tetrachloroethylene.

4. The process of claim 1 further comprising distilling the glycidol rich phase to isolate pure glycidol.

5. The process for isolating glycidol from an azeotroping agent which boils above 126° C. and which forms a homogeneous azeotrope with glycidol, which comprises:
    a. Adding to the glycidol-azeotrope a second azeotroping solvent selected from the group consisting of n-heptane, iso-octane, n-octane, n-hexychloride and tetrachloroethylene which second azeotroping solvent forms an azeotrope with glycidol which has a lower boiling point than the homogeneous azeotrope, and which separates at 20°–40° C. into two phases,
    b. Distilling the lower boiling azeotrope away from the azeotroping agent boiling above 126° C.,
    c. Separating the two-phase distillate into a glycidol rich phase and a glycidol-lean phase, and
    d. Distilling the glycidol-rich phase to isolate pure glycidol.

TABLE 3
Azeotropic Experiments

| Lower Boiling Azeotropic Agent | B.P. °C. | Press. mm., Hg. | Higher Boiling Azeotropic Agent | B.P. °C. | Press. mm., Hg. | %GLD in Azeotrope | % GLD in GLD Rich Phase | % of Total GLD in GLD Rich Phase | Comments |
|---|---|---|---|---|---|---|---|---|---|
| I) Homogenous Distillates-Comparison Examples | | | | | | | | | |
| Toluene | 111 | 760 | None | 110 | 760 | 4.9 | — | — | |
| Ethylbenzene | 79 | 125 | DIBK | 74 | 125 | 13.7 | — | — | Trace of DIBK in distillate |
| o-Xylene | (136) 81 | (760) 100 | DIBK | 73.5 | 100 | 18.0 | — | — | " " |
| Chlorobenzene | 132 | 760 | — | 129 | 760 | 12.1 | — | — | — |
| II. Non-Homogeneous Distillates | | | | | | | | | |
| Run 1 n-Heptane | 98.5 | 760 | — | 96.5 | 760 | 7.9 | 96.8 | 95 | — |
| 2 Iso-Octane | 99 | 760 | — | 96.5 | 760 | 7.2 | 95.1 | 98 | — |
| 3 Iso-Octane | 99 | 760 | Ethylbenzene | 96.5 | 760 | 6.9 | 96.9 | 94 | Trace of Ethylbenzene in dist. top phase |
| 4 n-Octane | 126 | 760 | — | 117.5 | 760 | 18.0 | 97.0 | 98 | — |
| 5 | | | DIBK | 117.5 | 760 | 21.8 | 97.0 | 98 | — |
| 6 | 72 | 127 | DIBK | 65 | 127 | 9.7 | 97.6 | 96 | — |
| 7 | 126 | 760 | Ethylbenzene | 117.5 | 760 | 17.1 | 96.4 | 98 | 1.7% ethylbenzene in distillate top phase |
| 8 | 50 | 50 | — | 48 | 50 | 7.9 | — | — | — |
| 9 Ethylcyclohexane | 132 | 760 | — | 122.5 | 760 | 19.7 | 96.6 | 98 | — |
| 10 n-Hexylchloride | 133 | 760 | — | 129 | 760 | 19.0 | 87.6 | 70 | — |
| 11 Tetrachloroethylene | 121 | 760 | — | 117 | 760 | 8.7 | 77.0 | 81 | — |
| | | | DIBK | 117 | 760 | 8.7 | 77.2 | 82 | — |

6. The process of claim 5 in which the azeotroping agent which boils above 126° C. is selected from the group consisting of methyl ethyl ketone, diisobutyl ketone, cumene, ethylbenzene, o-xylene, m-xylene and p-xylene.

* * * * *